United States Patent
Latimer et al.

(10) Patent No.: US 6,978,927 B2
(45) Date of Patent: Dec. 27, 2005

(54) APPARATUS AND METHODS OF REVIEWING DEPOSITED CHECKS

(75) Inventors: Paul J. Latimer, Waterloo (CA); Michael Ancell, Kitchener (CA); Richard N. Hildred, Waterloo (CA); David Gregg Simmons, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/638,609

(22) Filed: Aug. 11, 2003

(65) Prior Publication Data

US 2005/0035191 A1  Feb. 17, 2005

(51) Int. Cl.⁷ .............................................. G06K 5/00
(52) U.S. Cl. ...................................... 235/380; 238/379
(58) Field of Search ................................ 235/380, 375, 235/381, 382, 382.5, 383, 384, 492, 379

(56) References Cited

U.S. PATENT DOCUMENTS

| | | | |
|---|---|---|---|
| 5,783,808 A * | 7/1998 | Josephson | 235/379 |
| 6,038,553 A | 3/2000 | Hyde, Jr. | |
| 6,328,207 B1 * | 12/2001 | Gregoire et al. | 235/379 |
| 6,504,946 B1 * | 1/2003 | Rossignoli | 382/139 |
| 2002/0145035 A1 | 10/2002 | Jones | |
| 2002/0152170 A1 | 10/2002 | Dutta et al. | |
| 2003/0023557 A1 * | 1/2003 | Moore | 705/50 |
| 2004/0010466 A1 * | 1/2004 | Anderson | 705/45 |
| 2005/0097046 A1 * | 5/2005 | Singfield | 705/42 |

FOREIGN PATENT DOCUMENTS

| | | |
|---|---|---|
| EP | 0 984 410 A1 | 3/2000 |
| WO | WO 01/84417 A1 | 11/2001 |

* cited by examiner

*Primary Examiner*—Thien M. Le
(74) *Attorney, Agent, or Firm*—Michael Chan

(57) ABSTRACT

Deposit transaction data associated with a check deposited at an automated teller machine (ATM) is processed to determine if the deposited check is acceptable. Deposit transaction data relating to the deposited check is received from an ATM switch. A determination is made as to whether the deposited check is acceptable based upon the transaction data. A flag is set and a risk score is assigned when the deposited check is determined to be unacceptable. A second source file is created using set flags and assigned risk scores, and then sent to a data server. The second source tile is merged with associated deposit data retrieved from memory at the data server. The merged file is sent to a deposit review processor and a deposit review workstation. The deposit review processor determines if any deposited item needs to be reviewed by a human operator or outsorted based upon data contained in the merged file.

18 Claims, 12 Drawing Sheets

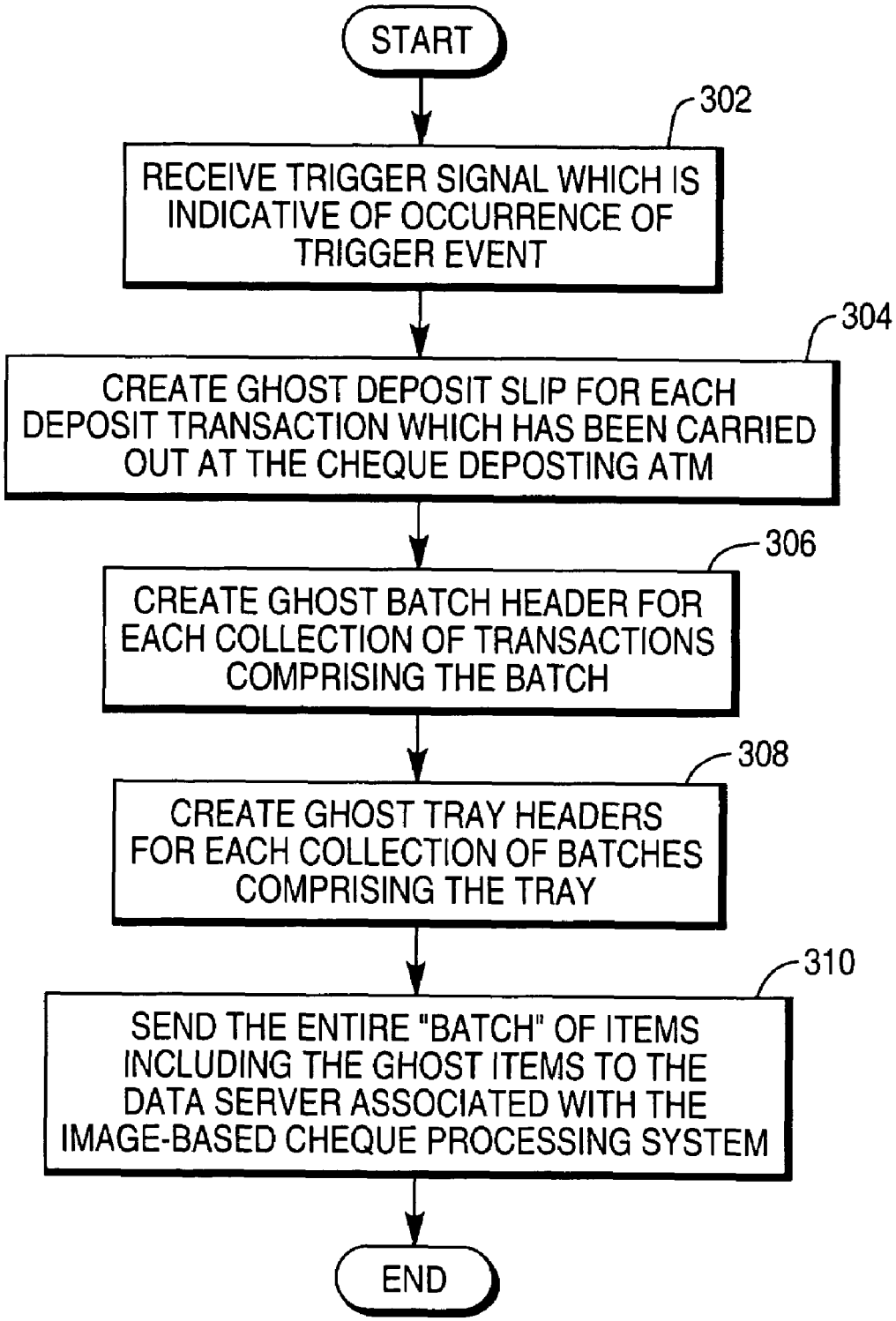

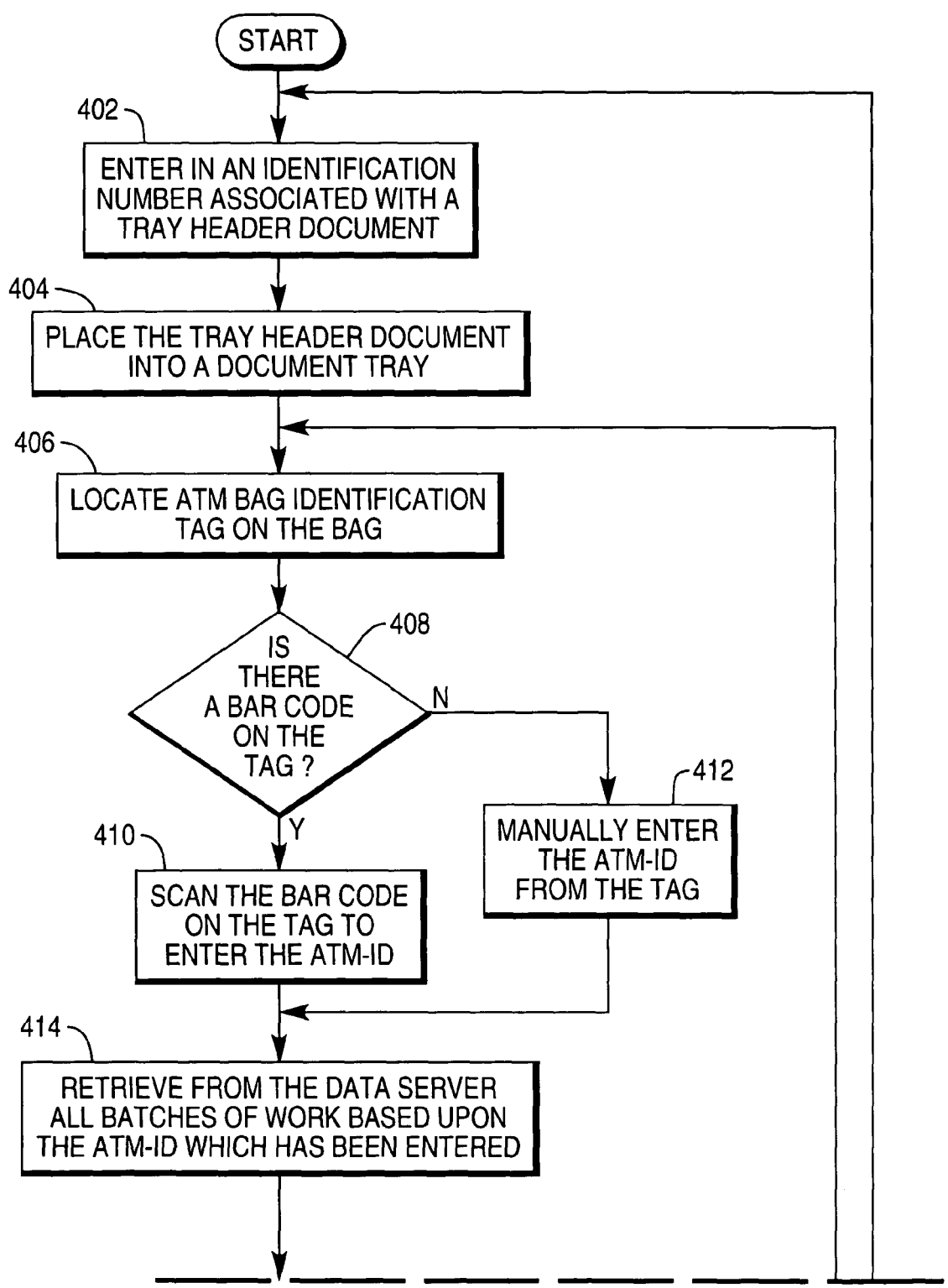

APPARATUS AND METHODS OF REVIEWING DEPOSITED CHECKS

BACKGROUND OF THE INVENTION

The present invention relates to cheque processing, and is particularly directed to an apparatus and methods of reviewing deposited cheques, such as a cheque deposited at a self-service terminal like a cheque depositing automated teller.

A cheque depositing ATM allows a user to deposit a cheque in a public access, unattended environment. To deposit a cheque, a user inserts a user identification card through a user card slot at the cheque depositing ATM, enters the amount of the cheque being deposited, and inserts a cheque to be deposited through a cheque slot. A cheque transport mechanism receives the entered cheque and transports the cheque in a forward direction along a cheque transport path to a number of locations within the ATM to process the cheque. If the cheque is not accepted for deposit, the cheque is returned to the user via the cheque slot. If the cheque is accepted for deposit, the amount of the cheque is deposited into the user's account and the cheque is transported to and stored in a storage bin within the ATM. An endorser printer prints an endorsement onto the cheque as the cheque is being transported to the storage bin.

Cheques in the storage bin within the ATM are usually periodically picked up and physically transported via courier to a back office facility of a financial institution. At the back office facility, the cheques are prepared at a document preparation and tray building workstation for subsequent processing in an image-based cheque processing system located at the back office facility. In a first pass of cheques through the image-based check processing system, cheque image data which is representative of images of the cheques is captured. Then in a second pass of cheques through an image-based cheque processing system, the cheques are encoded and sorted and matched up with their corresponding cheque image data which was previously captured during the first pass of cheques. The second pass of cheques may be made through either the same image-based cheque processing system that the first pass of cheques was made or a different image-based cheque processing system. Cheques are processed in the first and second passes through the image-based cheque processing system(s) for purpose of clearing cheques between financial institutions, as is known.

As an alternative to capturing cheque image data in a first pass of cheques through an image-based cheque processing system located at the back office facility (which requires the cheques to be physically transported from the ATM to the back office facility before the first pass of cheques can be performed), proposals have been made to remotely capture cheque image data at the cheque depositing ATM. After cheque image data is captured in a "first pass" of cheques through the cheque depositing ATM, the remotely-captured cheque image data is sent electronically to the back office facility. At a later time, the cheques are picked up and physically transported via courier to the back office facility. Then, in a "second pass" of cheques through an image-based cheque processing system located at the back office facility, the cheques are encoded, sorted, and matched up with their corresponding cheque image data which was previously captured at the cheque depositing ATM and sent electronically to the back office facility. Before cheques can be processed in the "second pass" through the image-based cheque processing system, each physical cheque needs to be associated with its corresponding cheque image data which was previously received from the particular cheque depositing ATM at which the cheque was deposited.

From the vantage point of the financial institution receiving a deposited cheque, the receiving of a cheque deposited at a cheque depositing ATM is different from the receiving of a cheque deposited at a teller station. When a depositor deposits a cheque at a teller station, a human teller reviews the cheque before the amount of the cheque is actually deposited into the depositor's account. The human teller may review the physical cheque for negotiability. The human teller may also review certain available information about the depositor or the depositor's account. The human teller may place a hold on the deposited amount of the deposited cheque based upon review of the physical cheque and the information about the depositor or the depositor's account.

In some known cheque depositing ATM applications, human operators usually located at a remote, centralized center are employed to review cheques which have been deposited at a cheque depositing ATM. In these known applications, the deposited cheques are reviewed by a human operator located at the remote, centralized center after the cheques have been processed through an image-based cheque processing system located at a back office facility. The remote, centralized center and the back office facility may be located at the same facility. It would be desirable for human operators reviewing deposited cheques to be able to review the deposited cheques for possible holds as early as possible.

SUMMARY OF THE INVENTION

In accordance with one aspect of the present invention, a method of a human operator reviewing a deposited cheque at a deposit review workstation comprises receiving from a data server a merged file containing transaction data associated with the deposited cheque, and reviewing the deposited cheque based upon the transaction data. The reviewing may include reviewing the deposited cheque for negotiability of the deposited cheque. The reviewing may include reviewing the deposited cheque for funds availability risk. The merged file may comprise cheque image data corresponding to the deposited cheque. The merged file may comprise account details associated with the person who deposited the cheque.

In accordance with another aspect of the present invention, a computerized method of processing transaction data associated with a deposited cheque to determine if the deposited cheque needs to be manually reviewed by a human operator comprises receiving from a data server a merged file containing transaction data relating to the deposited cheque, and determining if the deposited cheque needs to be reviewed by a human operator based upon the transaction data. The determining may include determining if a codeline associated with the deposited cheque is blank. The determining may include determining if a codeline associated with the deposited cheque is unreadable. The determining may include determining if a signature is missing on the deposited cheque. The determining may include determining if a date on the deposited cheque is a stale date. The determining may include determining if an amount associated with the deposited cheque is greater than a predetermined amount. The determining may include determining if the deposited cheque is a self-on-self deposit.

In accordance with yet another aspect of the present invention, a computerized method of processing deposit transaction data associated with a cheque deposited at an automated teller machine (ATM) to determine if the deposited cheque is acceptable comprises receiving from an ATM switch deposit transaction data relating to the deposited cheque, and determining if the deposited cheque is acceptable based upon the transaction data. The computerized method may further comprise setting a flag and assigning a risk score when the deposited cheque is determined to be unacceptable. The computerized method may further comprise creating a second source file using set flags and assigned risk scores. The determining may include determining if the cheque is deposited to a new account, determining includes determining if an account to which the deposited cheque has been made is overdrafted, or determining if the amount of the deposited cheque is greater than a predetermined amount.

In accordance with still another aspect of the present invention, an apparatus is provided for processing transaction data associated with a deposited cheque to determine if the deposited cheque needs to be manually reviewed by a human operator. The apparatus comprises means for receiving from a data server a merged file containing transaction data relating to the deposited cheque, and means for determining if the deposited cheque needs to be reviewed by a human operator based upon the transaction data.

In accordance with another aspect of the present invention, an apparatus is provided for processing deposit transaction data associated with a cheque deposited at an automated teller machine (ATM) to determine if the deposited cheque is acceptable. The apparatus comprises means for receiving from an ATM switch deposit transaction data relating to the deposited cheque, and means for determining if the deposited cheque is acceptable based upon the transaction data. The apparatus may further comprise means for setting a flag and assigning a risk score when the deposited cheque is determined to be unacceptable. The apparatus may further comprise means for creating a second source file using set flags and assigned risk scores.

BRIEF DESCRIPTION OF THE DRAWINGS

These and other aspects of the present invention will be apparent from the following specific description, given by way of example, with reference to the accompanying drawings, in which:

FIG. 6 is a flowchart illustrating steps involved in a transaction data consolidating operation;

DETAILS OF THE INVENTION

The present invention relates to cheque processing, and is particularly directed to an apparatus and methods of reviewing deposited cheques, such as a cheque deposited at a self-service terminal like a cheque depositing automated teller.

Figure 1:
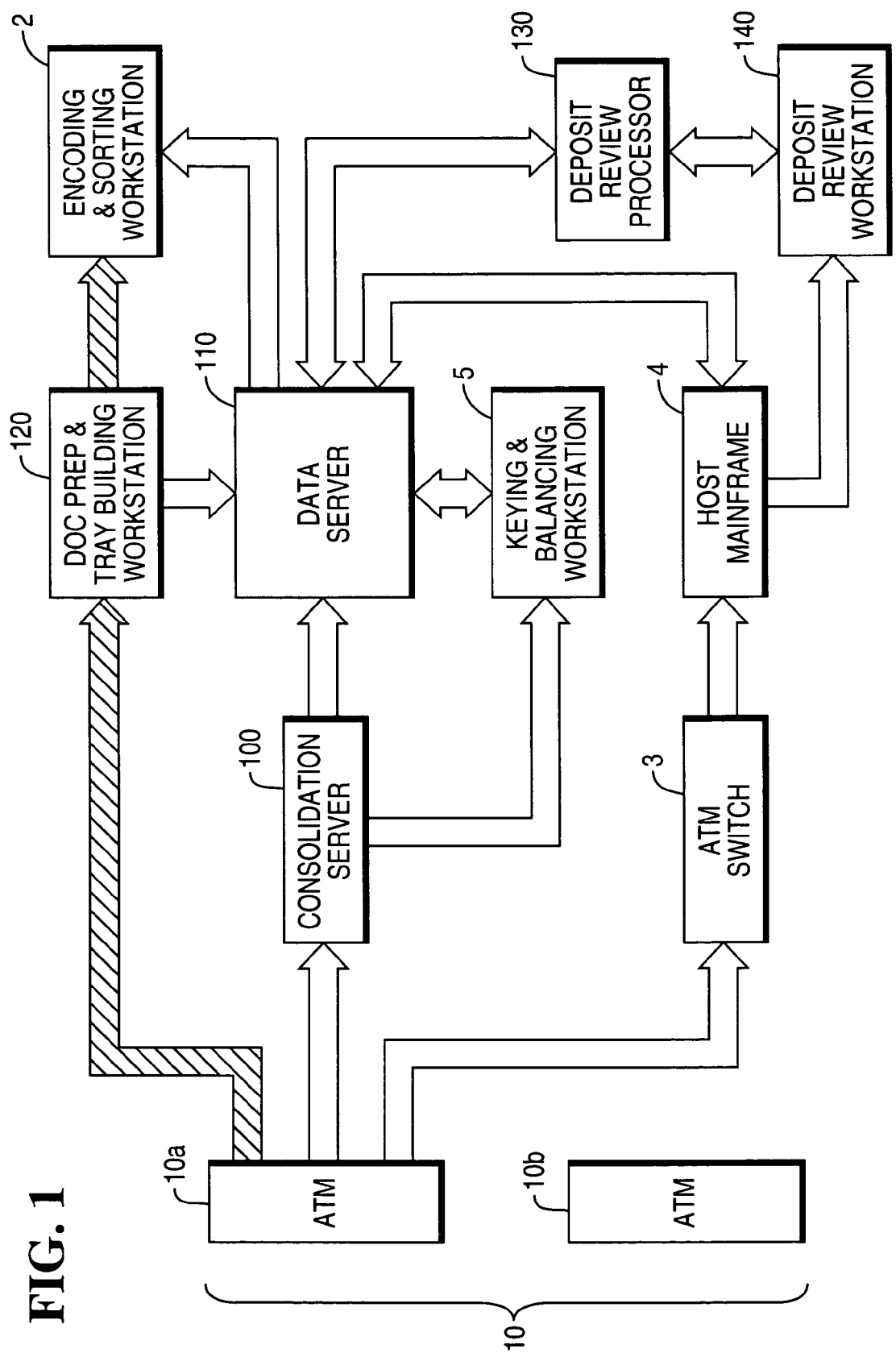
FIG. 1 is a block diagram of a networked system including a deposit review workstation in accordance with the present invention.

As shown in FIG. 1, a networked system includes a network of cheque depositing ATMs 10 (only two shown in FIG. 1 and designated with reference numbers "10a" and "10b"). The cheque depositing ATMs 10 are electronically connected through a consolidation server 100 to a data server 110 which is associated with an image-based cheque processing system 2 in the form of an encoding and sorting workstation located at a back office facility. The encoding and sorting workstation 2 may comprise the Model iTRAN 8000 Item Processing System, manufactured by NCR Corporation, located in Dayton, Ohio.

Each of the cheque depositing ATMs 10a, 10b has similar construction and operation. For simplicity, only the cheque depositing ATM 10a will be described in detail hereinbelow. It should be noted that the unhatched arrow lines shown in FIG. 1 depict flow of electronic data, and that the hatched arrow lines depict flow of physical cheques.

Figure 2:
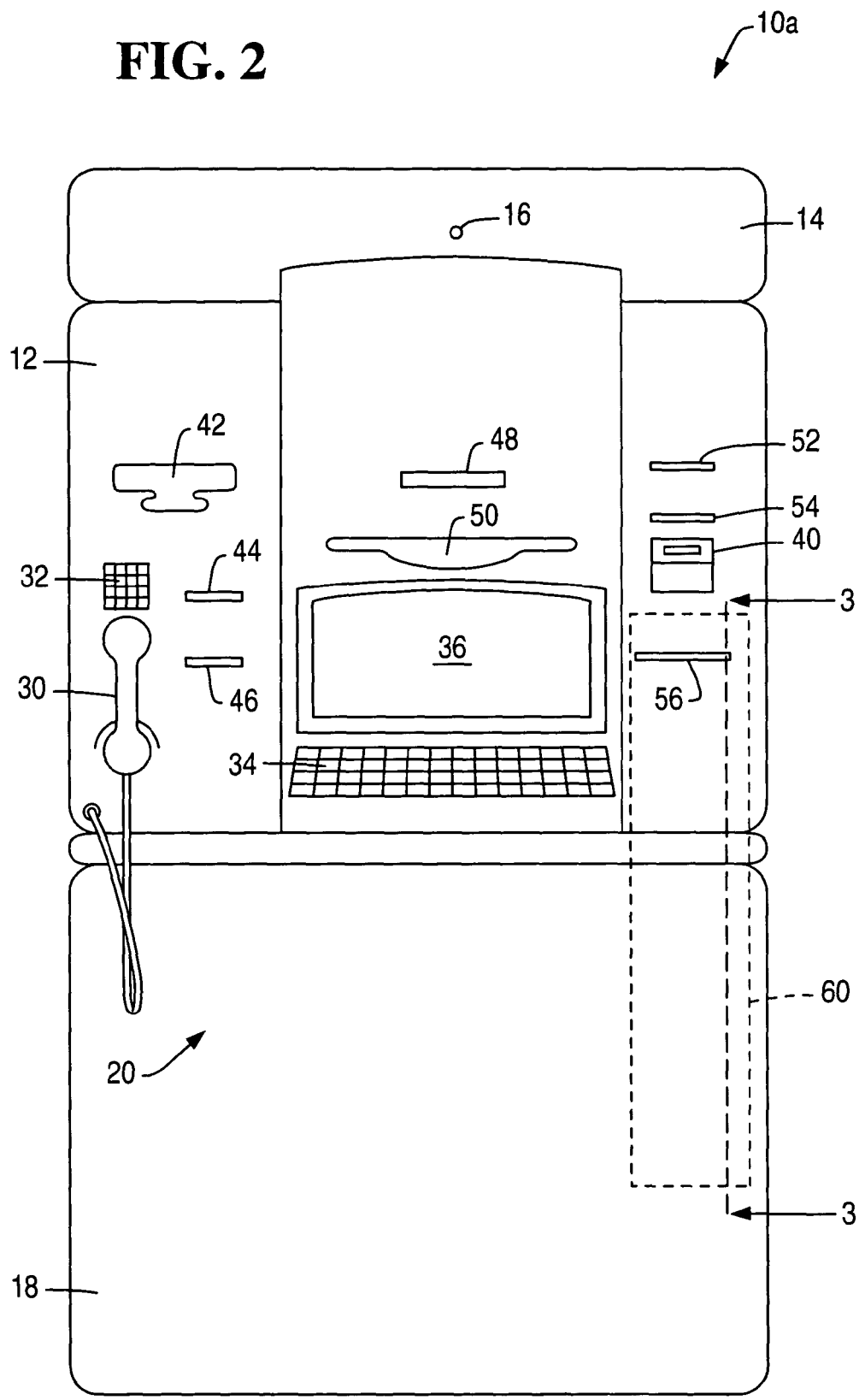
FIG. 2 is a pictorial diagram of a cheque depositing ATM shown in FIG. 1.

Referring to FIG. 2, the cheque depositing ATM 10a comprises a fascia 12 pivotably coupled to a chassis (not shown), an upper panel 14 mounted to the chassis and defining an aperture 16 through which a camera (not shown) images a user of the ATM 10a, and a lower panel 18 hingeably coupled to the chassis so that the lower panel 18 can be opened to reveal a safe (not shown) mounted in the chassis. When the lower panel 18 is open, the fascia 12 can be pivoted upwards to reveal ATM modules mounted within the chassis.

The fascia 12 and lower panel 18 provide a user interface 20 for allowing a user to execute a transaction. The fascia 12 includes a handset 30 and a telephone keypad 32 for allowing a user to contact a remote operator (not shown) typically located in a call centre (not shown). The fascia 12 also includes an encrypting keyboard 34 for allowing a user to enter transaction details, and a display 36 for presenting screens to a user. The fascia 12 also defines eight slots for receiving and dispensing media items, and a tray 40 into which coins can be dispensed. The slots include a money order printer slot 42, a bunch note input slot 44, a bunch note exit slot 46, a statement output slot 48, a cash dispense slot 50, a card reader slot 52, a card issue slot 54, and a cheque input/output slot 56. The slots 42 to 56 and tray 40 are arranged so that when the fascia 12 is closed, the slots and tray align with corresponding ATM modules mounted within the ATM's chassis (not shown). The user interface features described above are all provided on an NCR PERSONAS (trademark) 5878 financial services centre ATM, available from NCR Financial Solutions Group Limited, Discovery Centre, 3 Fulton Road, Dundee, DD2 4SW, Scotland.

Figure 3:
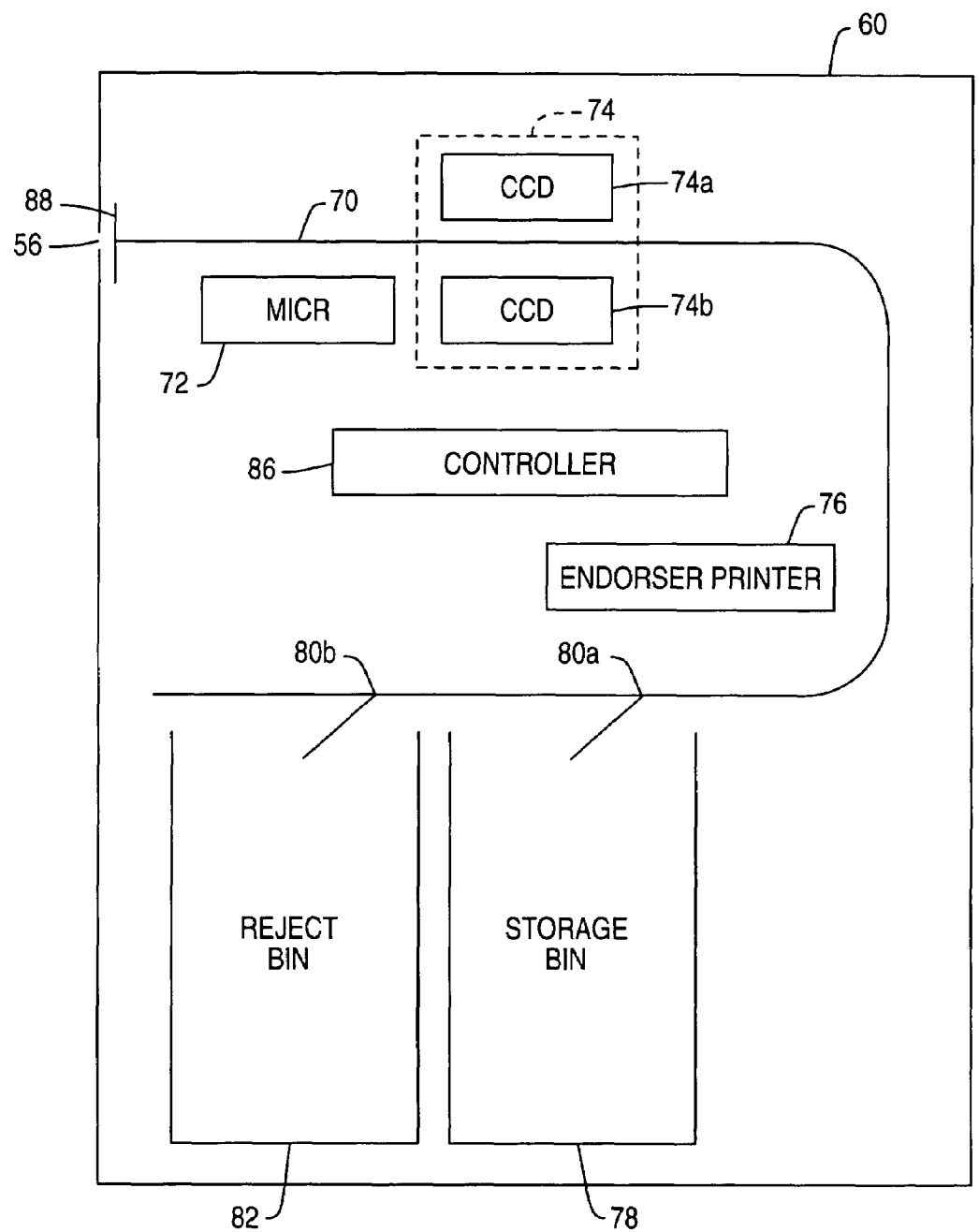
FIG. 3 is a simplified schematic sectional diagram, taken approximately along line 3—3 in FIG. 2, and showing a part (the cheque processing module) of the ATM of FIG. 2.
Figure 4:
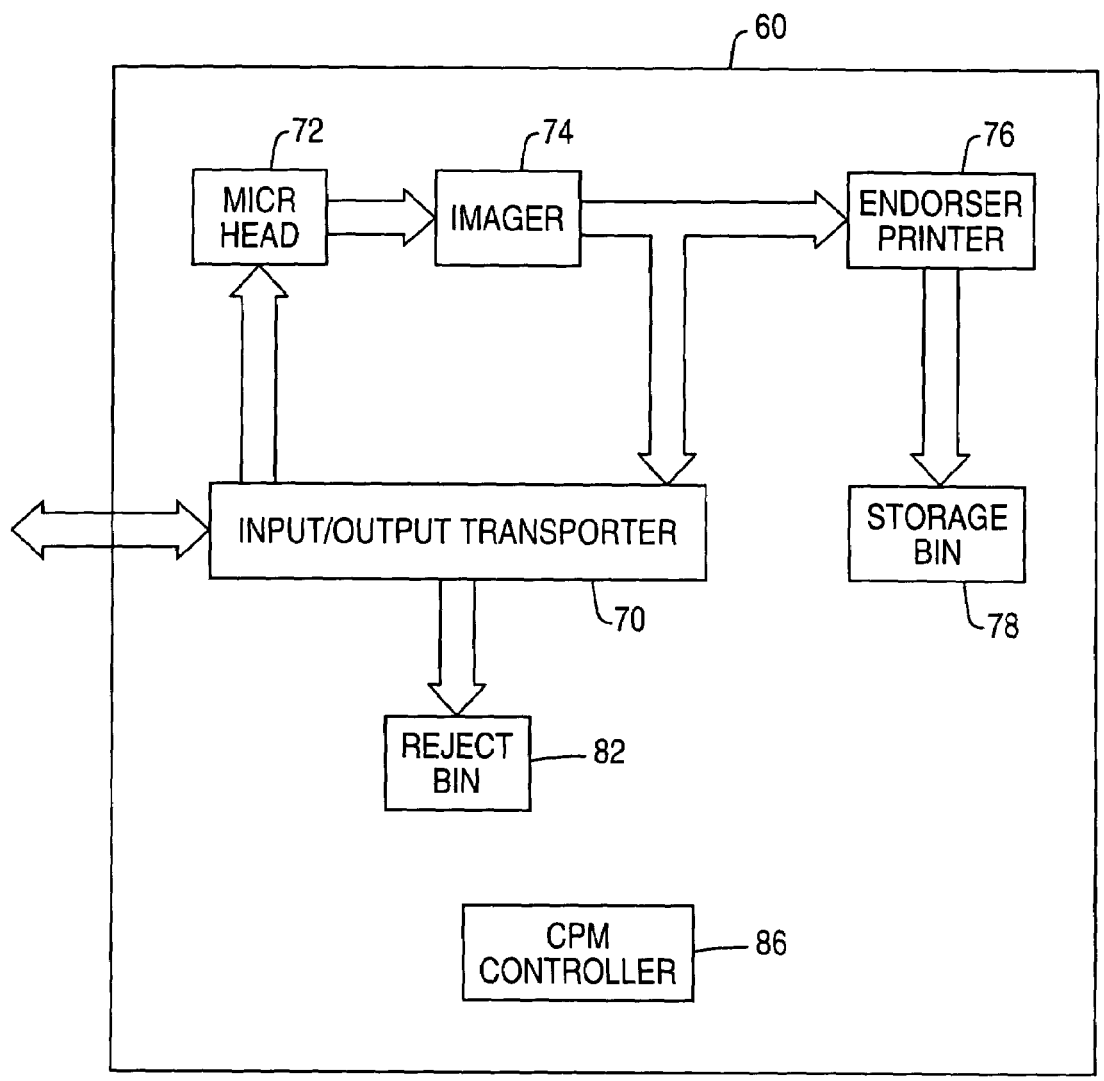
FIG. 4 is a block diagram of the cheque processing module of FIG. 3.

A cheque processing module (CPM) 60 will now be described with reference to FIG. 3 and FIG. 4. FIG. 3 is a simplified schematic sectional diagram (along line 3—3 in FIG. 2) showing part of the fascia 12 and lower panel 18, and the main parts of the CPM 60. FIG. 4 is a block diagram illustrating the main elements in the CPM 60. The CPM 60 is a modified version of a conventional cheque processing module, such as the cheque processing module provided with the PERSONAS (trademark) 5878 NCR ATM.

The CPM 60 comprises the following elements: a cheque input/output transport mechanism 70 including an alignment mechanism for aligning a cheque; a magnetic ink character ink recognition (MICR) head 72 for reading magnetic details on a code line of a cheque; an imager 74 including an upper 74a and lower 74b CCD camera for capturing an image of each side of a cheque (front and rear); a printer 76 for endorsing a cheque; a storage bin 78 for storing processed cheques, and a reject bin 82 for storing rejected cheques. The transport mechanism 70 includes two divert gates 80a, 80b for diverting cheques to either the storage bin 78 or the reject bin 82. The elements are conventional and will not be described in detail herein. The CPM 60 also includes a controller 86 for controlling the operation of the elements within the CPM 60. The CPM 60 also includes an entrance shutter 88 for opening and closing the cheque input/output slot 56.

Figure 5:
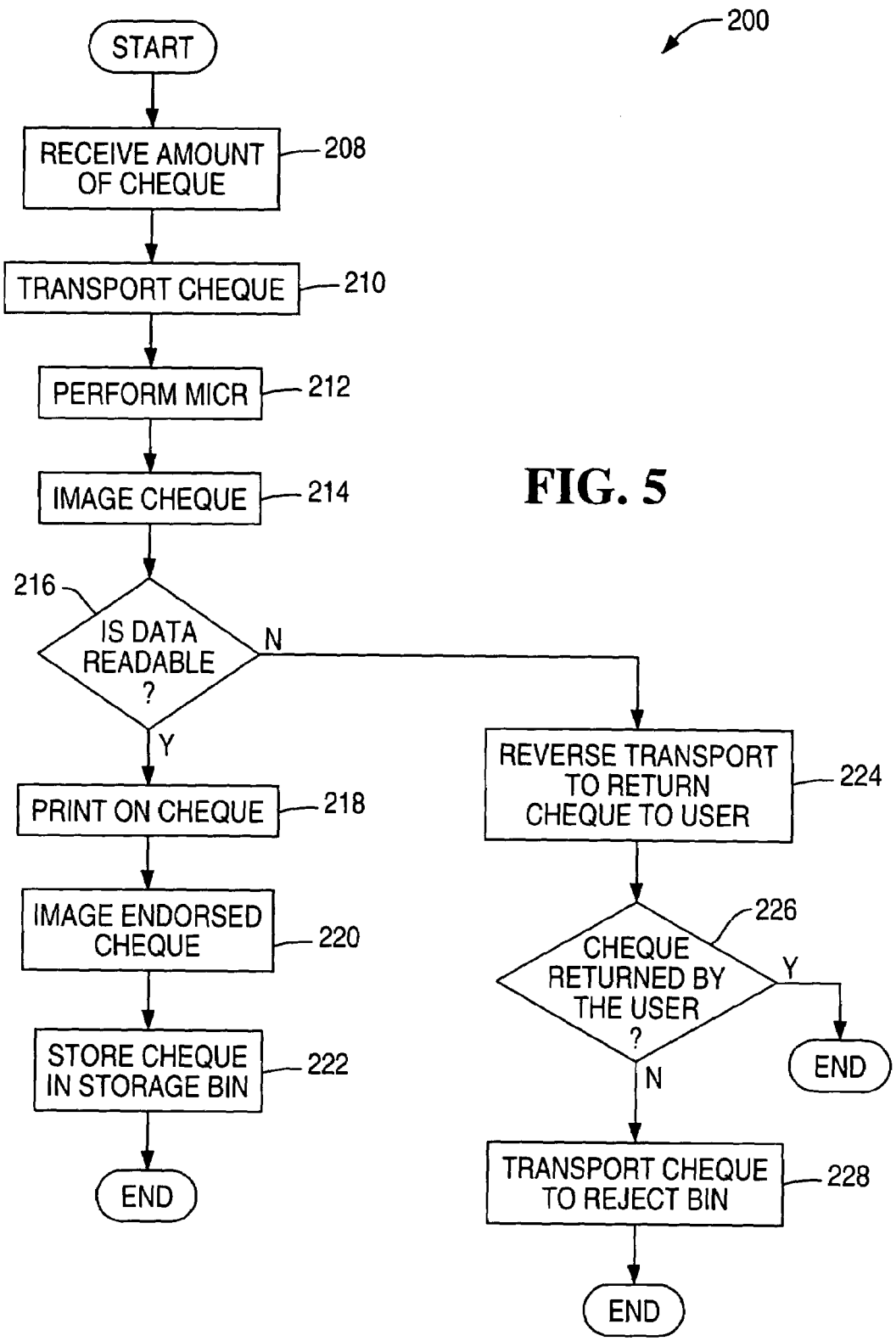
FIG. 5 is a flowchart illustrating steps involved in a cheque depositing operation.

A typical transaction will now be described with reference to FIG. 5 which is a flowchart 200 depicting steps involved in a cheque depositing transaction, and also with reference to FIGS. 2 to 4. In this transaction, the user enters a user identification card into the card reader slot 52, selects "cheque depositing" from a list of transaction options presented on the display 36, enters the amount of the cheque via the keyboard 34, and inserts the cheque to be deposited through the cheque input/output slot 56. The controller 86 receives the cheque amount entered by the user (step 208), and opens the slot shutter 88. The transport mechanism 70 receives the cheque and transports the cheque (step 210) to the MICR head 72 where a code line on the cheque is read (step 212). The transport mechanism 70 then transports the cheque to the imager 74, where both sides of the cheque are imaged (step 214).

The controller 86 then verifies that data from the codeline and/or the image is readable (step 216). If data from the cheque is readable as determined in step 216, the printer 76 prints endorsement data onto the cheque (step 218). The cheque is then transported to the imager 74 to image the endorsed cheque (step 220) before it is transported to the storage bin 78 (step 222) for subsequent collection and further processing. Although the above describes both steps 214 and 220 being performed, it is conceivable that only one of these steps be performed. Preferably, step 214 is performed, and step 220 is optionally performed.

When a deposit transaction is made at the ATM 10a as described hereinabove, transaction data relating to the deposit is sent via an ATM switch 3 to a host mainframe 4 which is usually located at a central facility of a financial institution. The host mainframe 4 processes the transaction data in a known manner to deposit the amount of the cheque into the user's account. The structure and operation of the ATM switch 3 and the host mainframe 4 are conventional and, therefore, will not be described. Also, the process of the ATM 10a sending transaction data via the ATM switch 3 to the host mainframe 4 is known and conventional and, therefore, will not be described.

If data from the cheque is unreadable as determined in step 216, a cheque return operation is initiated. When this occurs, the transport mechanism 70 reverses the direction of transport (step 224) to convey the cheque to the cheque input/output slot 56 to return the cheque to the user via the cheque input/output slot. The controller 86 may monitor the slot 56 to ensure that the cheque has been removed by the user (step 226). If the user has not removed the cheque within a predetermined time period, the cheque is retracted and conveyed to the reject bin 82 (step 228).

Although the above-description describes a cheque being deposited in its entire amount by the user, it is contemplated that the cheque may be deposited only in partial amount of the entire amount of the cheque at the ATM 10a, with the remaining amount of the cheque being cashed and delivered to the user. Accordingly, it is contemplated that cheque image data may be captured at any type of self-service terminal, such as a cheque depositing ATM, a cheque depositing/cashing ATM, a cheque cashing ATM, or the like, which has cheque-imaging capability.

When the above-described depositing transaction is carried, transaction data including captured cheque image data associated with the transaction is sent electronically to the consolidation server 100. The server 100 receives the transaction data including cheque image data and stages this data in a database or other storage mechanism. The server 100 stages transaction data including cheque image data for each transaction carried out at the ATM 10a. It should be noted that the server 100 stages transaction data including cheque image data in the same manner for each transaction carried out at each of the other ATMs in the network of ATMs 10 shown in FIG. 1.

The server 100 stages transaction data including cheque image data received from the network of ATMs 10 including the ATM 10a until a trigger event occurs. When the trigger event occurs, the server 100 consolidates and "batches" all transaction data including cheque image data which has been staged since the last trigger event occurred. The server 100 sends the consolidated data to the data server 110 shown in FIG. 1 for subsequent processing at different workstations including the encoding and sorting workstation 2.

The trigger event which causes the server 100 to consolidate data may occur in a number of different ways. For example, the trigger event may comprise a threshold of a certain number of transactions received from all ATMs in the network of ATMs 10 shown in FIG. 1. The trigger event may comprise a threshold of a certain number of transactions received from any ATM in the network of ATMs 10. Other examples include a certain time of day, and a certain amount of time elapsed since the last transmission of consolidated data to the data server 110. Also, the trigger event may occur when a predetermined amount of time has elapsed. For example, the trigger event may occur every half hour.

As another example, the trigger event may comprise a "bin-emptied" event received from an ATM. A signal indicative of a "bin-emptied" event may be generated at either the ATM or the server 100. The "bin-emptied" event indicates that the storage bin at the particular ATM has been emptied by a courier. It should be noted that the "bin-emptied" event delimits the physical items that the back office facility at which the encoding and sorting workstation 2 is located should expect to receive for the day, as will be described in more detail later. The trigger event may comprise a "business day cutover" event which may be a specific time-of-day, for example. The "business day cutover" event may be an external event, such as from an ATM switch, for example. The trigger events described hereinabove are exemplary only. It is contemplated that the trigger event may comprise other trigger events not described above. As mentioned, when a trigger event occurs, the server 100 consolidates transaction data including cheque image data which has been staged as described hereinabove and sends the consolidated data to the data server 110 for further processing.

Referring to FIG. 6, a flowchart 300 depicts steps involved in a transaction data including cheque image data consolidating operation. In step 302, the server 100 receives a trigger signal indicative of occurrence of a trigger event as described in detail hereinabove.

Then, in step 304, a ghost deposit slip is created. The ghost deposit slip is a "ghost item" which is an image of a document (in this case of a deposit slip) which physically does not exist. The ghost deposit slip is created from stock image data stored in memory at the server 100, and includes information typical of known physical deposit slips.

More specifically, the ghost deposit slip is a credit and represents the deposit total as declared by a user for each transaction. The amount of the credit should equal the sum of debits declared for each item in the particular transaction (i.e., each cheque and each bunch of cash). It should be apparent that the ghost deposit slip is used to capture and hold what was keyed in by a user at the particular ATM where the associated deposit transaction was carried out.

The ghost deposit slip contains MICR codeline information which has been added to the image so that this item will appear as if it had been processed through a first pass of items in a back office environment. It should be noted that all ghost items will have corresponding MICR codeline information added to their respective images for this reason. The ghost deposit slip also contains other information including the ATM identification (ATM-ID) number, the bank account number, the routing transit number, the transaction sequence number, the date of the transaction, the time of the transaction, etc., for examples. It is contemplated that the ghost deposit slip may include some or all of this information, depending upon specific needs and/or specific requirements of each application.

Similarly, as shown in step 306, a ghost batch header is created. The ghost batch header is also created from stock image data stored in memory at the server 100, and includes information typical of known physical batch header documents. More specifically, like a physical batch header document, the ghost batch header is used to delineate different batches of work, as is known. A typical batch of work includes approximately up to 300 or so items.

Ghost batch headers are provided herein for the purpose of managing workflow at a keying and balancing workstation 5 which is usually located at the same back office facility at which the encoding and sorting workstation 2 is located. The keying and balancing workstation 5 includes an amount keying workstation, a codeline completion workstation, and a balancing workstation (all not shown). Amounts of items are keyed in at the amount keying workstation, codelines of items are completed at the codeline completion workstation, and items of transactions (i.e., credits and debits) are balanced at the balancing workstation. The structure and operation of a keying and balancing workstation and the different workstations within the keying and balancing workstation are well known and, therefore, will not be described.

Also, as shown in step 308, two ghost tray headers are created. The ghost tray headers are also created from stock image data stored in memory at the server 100, and include information typical of known physical tray header documents. More specifically, like physical tray header documents, the ghost tray headers are used to delineate different trays of work, as is known. A typical tray of work includes approximately up to 2500 or so items.

The ghost tray headers, for each collection of batches of work, are provided herein for the purpose of indicating that all items in these batches of work are expected to arrive physically together at the back office facility at which the encoding and sorting workstation 2 is located for further processing at the back office facility. One of the ghost tray headers is associated with ghost items only. The other one of the ghost tray headers is associated with physical cheques that were deposited. Although the above describes ghost deposit slips, ghost batch headers, and ghost tray headers being provided, it is contemplated that other ghost items may need to be provided. For example, ghost tracers and ghost block headers would also need to be provided if the network of ATMs 10 is connected to a host system.

Then, in step 310, the entire "batch" of transaction items including the ghost items created in steps 304, 306, and 308 are electronically transmitted from the server 100 to the data server 110. Transaction data including cheque image data associated with transaction items and data associated with the ghost deposit slips are subsequently processed at the back office facility to be described in detail later. As mentioned, the ghost batch headers created in step 306 are used for controlling workflow at the keying and balancing workstation 5, and the ghost tray headers created in step 308 are used for indicating the batches of work expected to arrive physically together at the back office facility at which the encoding and sorting workstation 2 is located.

It should be apparent that when a trigger event occurs as described hereinabove, all associated data is "batched" and sent electronically to the data server 110 as if all of the paper associated with the batched data were just captured in a "first pass" of cheques through an image-based cheque processing system located at the back office facility. Also, it should be apparent that the ghost items (i.e., ghost deposit slips, the ghost batch headers, and the ghost tray headers in this case) make it look as if the corresponding physical items existed and were captured in the first pass through an image-based cheque processing system. Further, it should be apparent that the server 100 formats transaction data (which arrives sporadically and is typically low volume) into a data stream (which is continuous data feed and is typically high volume) ready for further processing in a "second pass" of cheques through the encoding and sorting workstation 2, shown in FIG. 1, located at the back office facility.

A courier picks up deposited cheques from the storage bin in each of the ATMs 10 including the ATM 10a. The cheques picked up from each of the ATMs 10 are placed in an associated ATM bag and transported to the back office facility at which the encoding and sorting workstation 2 is located for subsequent processing. Each bag has a tag containing an ATM identification number (ATM-ID) which identifies the particular ATM at which the cheques in the bag have been picked up from. In the example of the present application described hereinabove, the ATM-ID on the bag would identify the ATM 10a as the particular ATM at which the cheques in the bag have been picked up from.

When the bags arrive at the back office facility, the bags are received at a document preparation and tray building workstation 120, as shown in FIG. 1. At the document preparation and tray building workstation 120, the cheques in each bag are built into document trays in a manner to be described hereinbelow.

Figure 7B:
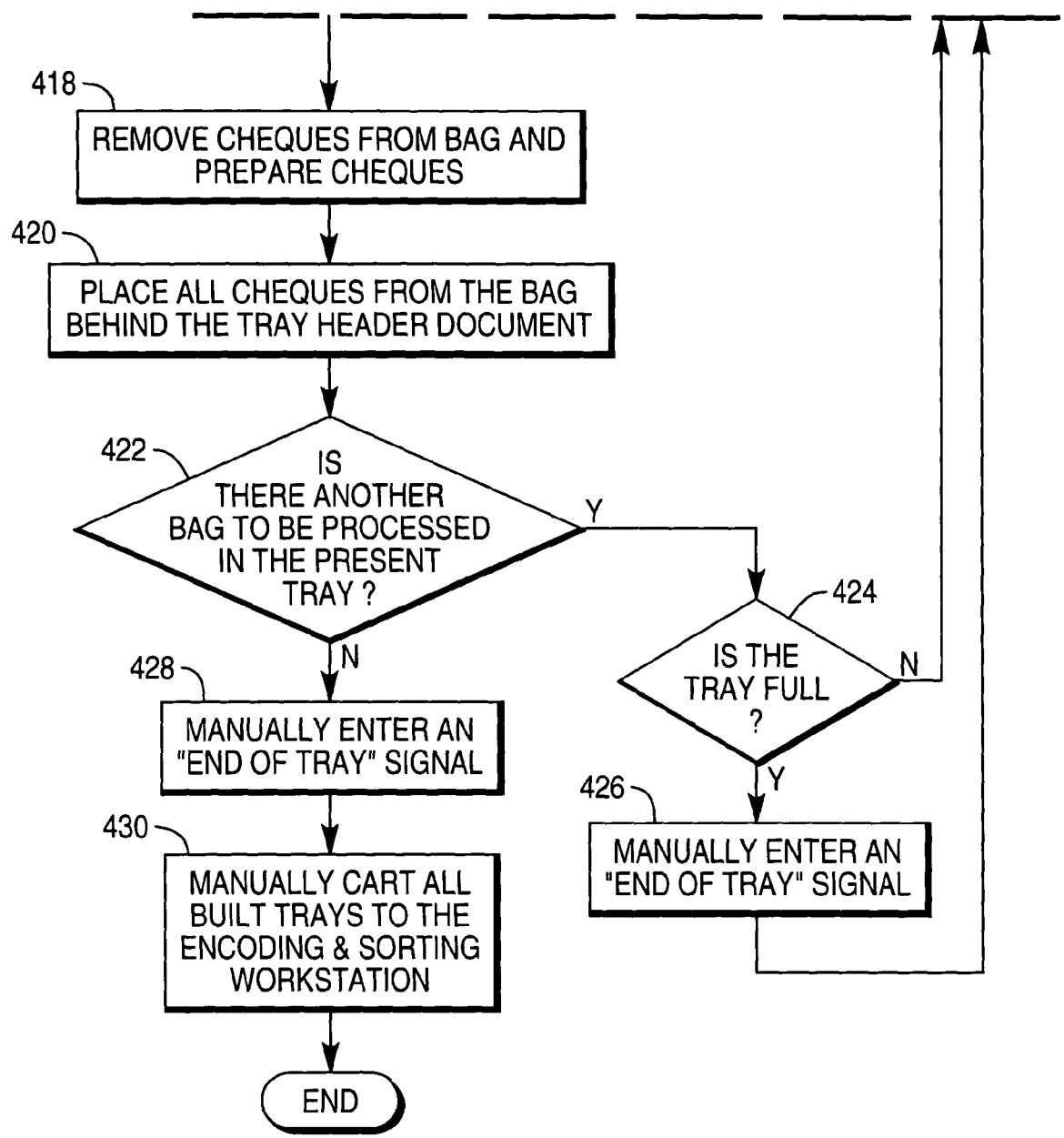
FIG. 7 is a flowchart illustrating steps involved in a document tray building operation.

Referring to FIG. 7, a flowchart 400 depicts steps involved in a document tray building operation. At the document preparation and tray building workstation 120, an identification number from a tray header document is entered (step 402). There are a number of ways to enter the identification number of the tray header document. One way is to manually enter the identification number. Another way is to use a barcode scanner to scan the identification number.

Still another way is to use a desktop MICR reader to read the identification from a MICR line on the tray header document. The tray header document is then placed into a document tray (step 404).

When the tag on the bag is located (step 406), a determination is made as to whether a barcode is on the tag (step 408). If the determination in step 408 is affirmative, the barcode is scanned in from the tag on the bag to enter the ATM-ID (step 410). Otherwise, the ATM-ID is manually entered (step 412) via keyboard, for example.

After the ATM-ID from the tag on the bag has been entered, all batches of work stored in the data server 110 and associated with the ATM-ID are retrieved (step 414). It should be noted that during this retrieval of the batches of work stored in the data server 110, all ghost tray headers are ignored and not retrieved. The ghost tray headers are ignored and not retrieved because these ghost tray headers are not needed in the document tray building operation described herein.

Then the cheques contained in the bag are removed from the bag (step 418). The cheques are prepared for further processing by properly orienting the cheques and by removing paper clips, staples, and the like. The prepared cheques are placed into the document tray (step 420) behind the tray header document which was placed into the document tray in step 404. It should be noted that the retrieved batches of work from step 414 are now associated with the physical tray header document which was placed into the document tray header in step 404.

A determination is made in step 422 as to whether there is another bag of cheques to be processed. If the determination in step 422 is affirmative, then a determination is made as to whether the present document tray is full (step 424). If the determination in step 424 is negative indicating that the present document tray is not yet full, the process returns to step 406 and cheques contained in the next bag are prepared in the same manner as described hereinabove. It should be noted that the cheques from this next bag are placed in the present document tray and right behind the cheques from the previously bag.

However, if the determination in step 424 is affirmative indicating that the present document tray is full, an "end of tray" signal is manually entered to delineate the end of the present document tray. The present document tray containing the tray header document and the cheques behind the tray header document is now built and ready to be processed at the encoding and sorting workstation 2. The process returns to step 402 to begin building a new document tray.

If the determination back in step 422 is negative indicating that there are no other bags of cheques to be processed, an "end of tray" signal is manually entered (step 428) to delineate the end of the present document tray. Again, the present document tray containing the tray header document and the cheques behind the tray header document is now built and ready to be processed at the encoding and sorting workstation 2. This document tray along with other document trays which have been built are manually carted to the encoding and sorting workstation 2 (step 430) and are ready to be processed further at the encoding and sorting workstation.

It should be apparent that the above-described document tray building process results in matching of physical work (i.e., cheques which have been deposited at a number of ATMs in a network of ATMs) with corresponding transaction data including cheque image data which was previously captured at the ATMs when the cheques were deposited. After the physical work and the corresponding transaction have been matched, the transaction data at the data server 110 can be sent to the host mainframe 4 for further processing at the host mainframe.

It should also be apparent that the number of document trays which need to be built to accommodate cheques from a relatively large number of ATMs is kept minimum or at least reduced. This is because cheques from many bags of cheques (and thus many ATMs) can be placed into only one document tray. Accordingly, any need to build a separate document tray for each bag of cheques is eliminated, and the total number of document trays which need to be built to accommodate all cheques from all ATMs is kept minimum or at least reduced.

By minimizing or at least reducing the number of document trays to be processed at the encoding and sorting workstation 2, a relatively high operating efficiency of the encoding and sorting workstation results. A relatively high operating efficiency results because the encoding and sorting workstation 2 does not need to be started and stopped as often to begin processing of a document tray of work when there is only a relatively small number of document trays of work to be processed. In contrast, the encoding and sorting workstation 2 would need to be started and stopped much more frequently if there were a relatively large number of document trays of work to be processed. In this latter case, a relatively low operating efficiency of the encoding and sorting workstation 2 would result.

For example, if there were 500 ATMs and each bag of cheques (i.e., each bag of cheques being associated with one ATM) is placed in its separate document tray, the encoding and sorting workstation 2 would need to be started and stopped 500 times to accommodate the 500 document trays of work. However, if document trays of work were built in accordance with the present invention as described hereinabove, it is expected that there would only be about ten document trays of work to be processed. In this case, the encoding and sorting workstation 2 would need to be started and stopped only ten times. This is a significant improvement over having to start and stop 500 times. The result is a relatively high operating efficiency of the encoding and sorting workstation 2.

Figure 8:
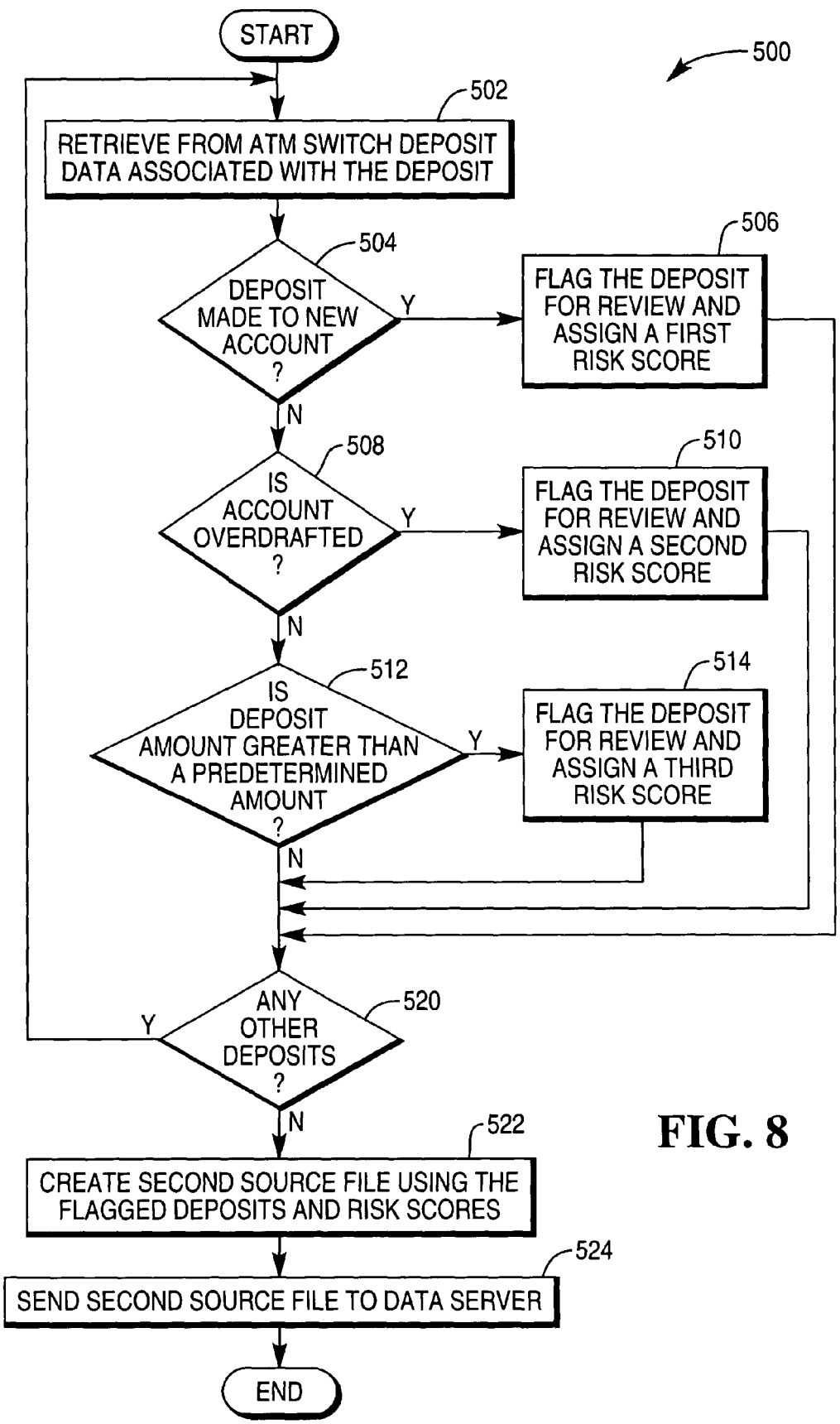
FIG. 8 is a flowchart illustrating steps involved in a deposit review operation performed by a host mainframe shown in FIG. 1.

Referring to FIG. 8, a flowchart 500 depicts steps involved in a deposit review operation performed by the host mainframe 4 shown in FIG. 1. In step 502, deposit transaction data associated with a deposited cheque is retrieved from the ATM switch 3. Based upon the retrieved deposit transaction data, a determination is made in step 504 as to whether the deposit was made to a new account. If the determination in step 504 is affirmative, a flag is set to flag the deposited cheque for review and a corresponding risk score is assigned to the deposited cheque (step 506) to indicate that the deposit was made to a new account.

However, if the determination in step 504 is negative, a determination is made in step 506 as to whether the account to which the deposited cheque was made is overdrafted. If the determination in step 506 is affirmative, a flag is set to flag the deposited cheque for review and a corresponding risk score is assigned to the deposited cheque (step 510) to indicate that the account to which the deposit was made is overdrafted. However, if the determination in step 508 is negative, a determination is made in step 512 as to whether the amount of the deposited cheque is greater than a predetermined amount. For example, the predetermined amount may be set at $1000. If the determination in step 512 is affirmative, a flag is set to flag the deposited cheque for review and a corresponding risk score is assigned to the deposited cheque (step 514) to indicate that the amount of the deposited cheque is greater than the predetermined amount.

If the determination in step 512 is negative, a determination is made as to whether there are any more deposited items to be reviewed (step 520). If the determination in step 520 is affirmative, the process loops back to step 502 to process the next deposited item in the same manner as just described hereinabove. However, if the determination in step 520 is negative, a second source file is created (step 522). The second source file is created using the set flags and the corresponding risk scores provided in steps 506, 510, and 514. It should be noted that the types of flags and the types of risk scores indicated in steps 506, 510, and 514 are exemplary only and, therefore, other types of set flags and other types of risk scores are possible. After the second source file is created in step 522, the second source file is sent to the data server 110 (step 524) shown in FIG. 1.

Figure 9:
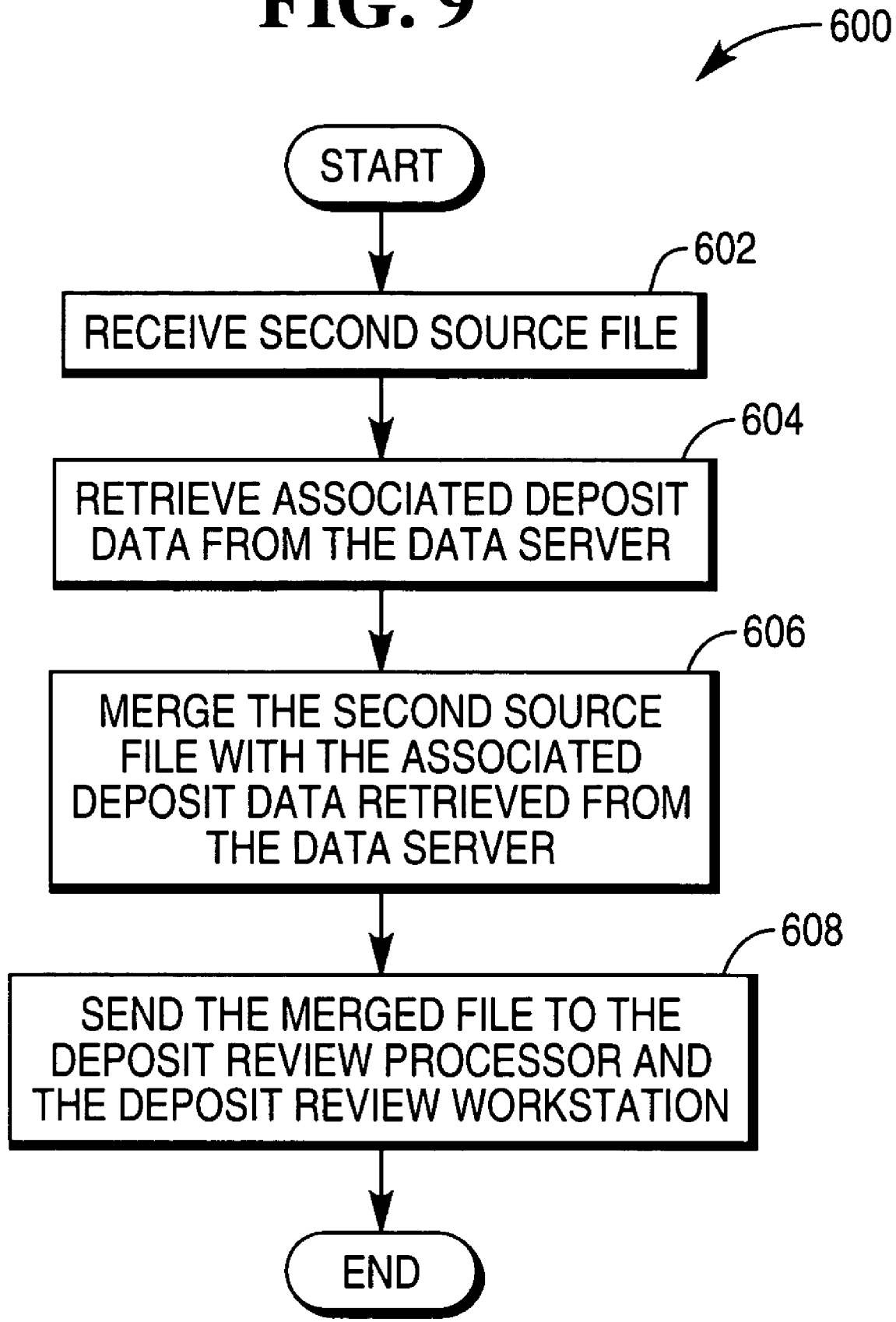
FIG. 9 is a flowchart illustrating steps performed by a data server shown in FIG. 1 to create a merged file.

Referring to FIG. 9, a flowchart 600 depicts steps performed by the data server 110 shown in FIG. 1 to create a merged file based upon the second source file which was created in the flowchart of FIG. 8 as described hereinabove. As shown in step 602, the data server 110 receives the second source file created in the flowchart of FIG. 8. Then, in step 604, deposit transaction data associated with the data contained in the second source file is retrieved from memory at the data server 110. This retrieved data and the data contained in the second source file are merged to create a merged file (step 606). The merged file is then sent to a deposit review processor 130 (shown in FIG. 1) and a deposit review workstation 140 (also shown in FIG. 1) for purposes to be described hereinbelow with reference to FIGS. 10 and 11.

Figure 10:
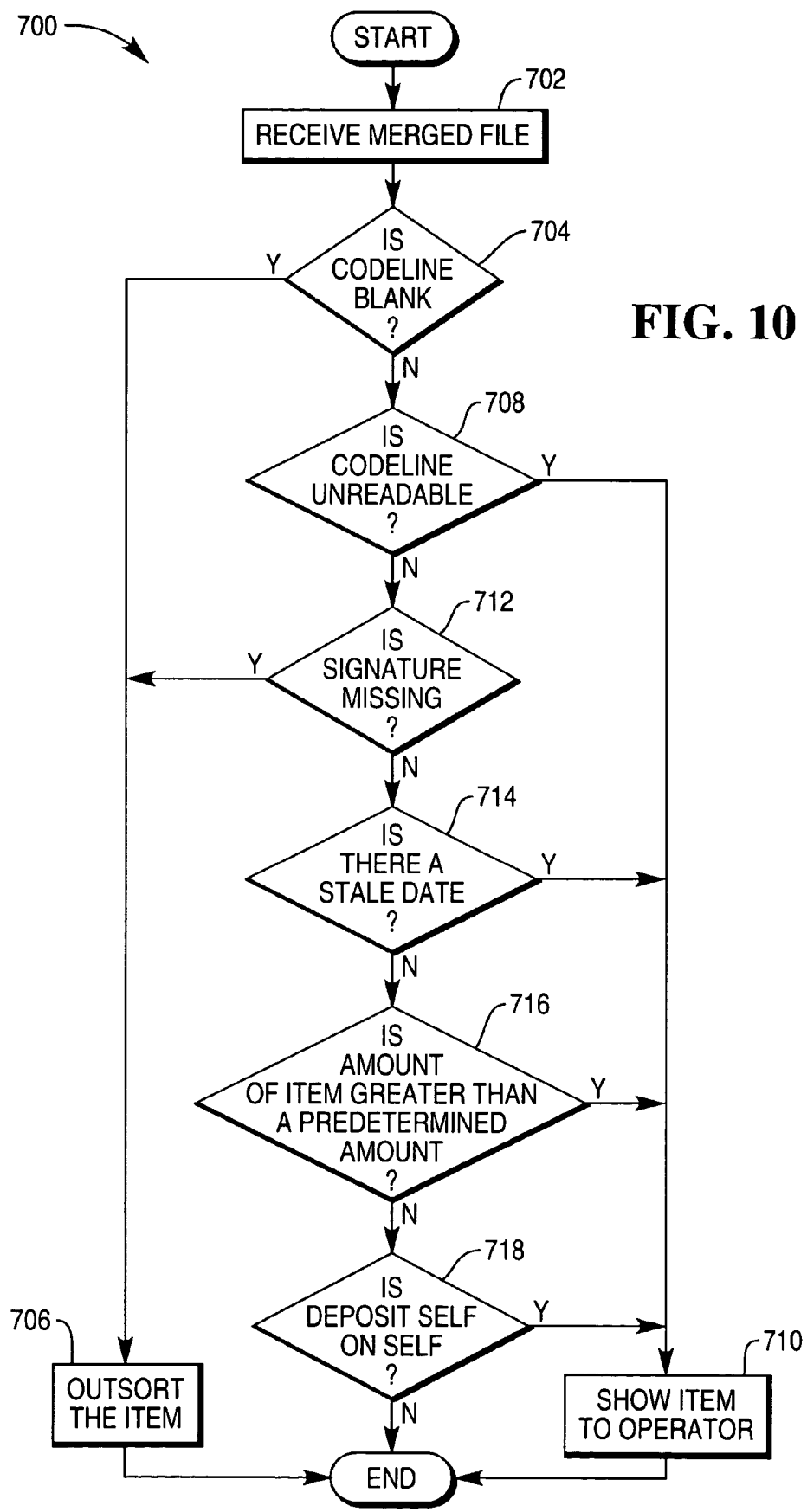
FIG. 10 is a flowchart illustrating steps involved in a deposit review operation performed by a deposit review processor shown in FIG. 1.

Referring to FIG. 10, a flowchart 700 depicts steps involved in a deposit review operation performed by the deposit review processor 130. As shown in step 702, the deposit review processor 130 receives the merged file created in the flowchart of FIG. 9. Based upon data contained in the merged file, a number of different determinations are made to determine if any deposited item needs to be reviewed by a human operator or outsorted. It should be noted that these determinations are exemplary only and, therefore, other types of determinations are possible.

For example, a determination is made in step 704 as to whether a deposited item contains a blank codeline. If the determination in step 704 is affirmative, a signal is generated to outsort the deposited item (step 706). As another example, a determination is made in step 708 as to whether the codeline on a deposited item is unreadable. If the determination in step 708 is affirmative, a signal is generated to show the deposited item to the human operator (step 710).

Other examples are shown in steps 712, 714, 716, and 718. In step 712, a determination is made as to whether the deposited item is missing a signature. In step 714, a determination is made as to whether the date on the deposited item is stale. In step 716, a determination is made as to whether the amount of the deposited item is greater than a predetermined amount. In step 718, a determination is made as to whether the deposited item is a self-on-self type of transaction. If any of these determinations are affirmative, a signal is generated to either outsort the associated deposited item (step 706) or show the associated deposited item to the human operator for review (step 710) as will be described in more detail below with reference to FIG. 11.

Figure 11:
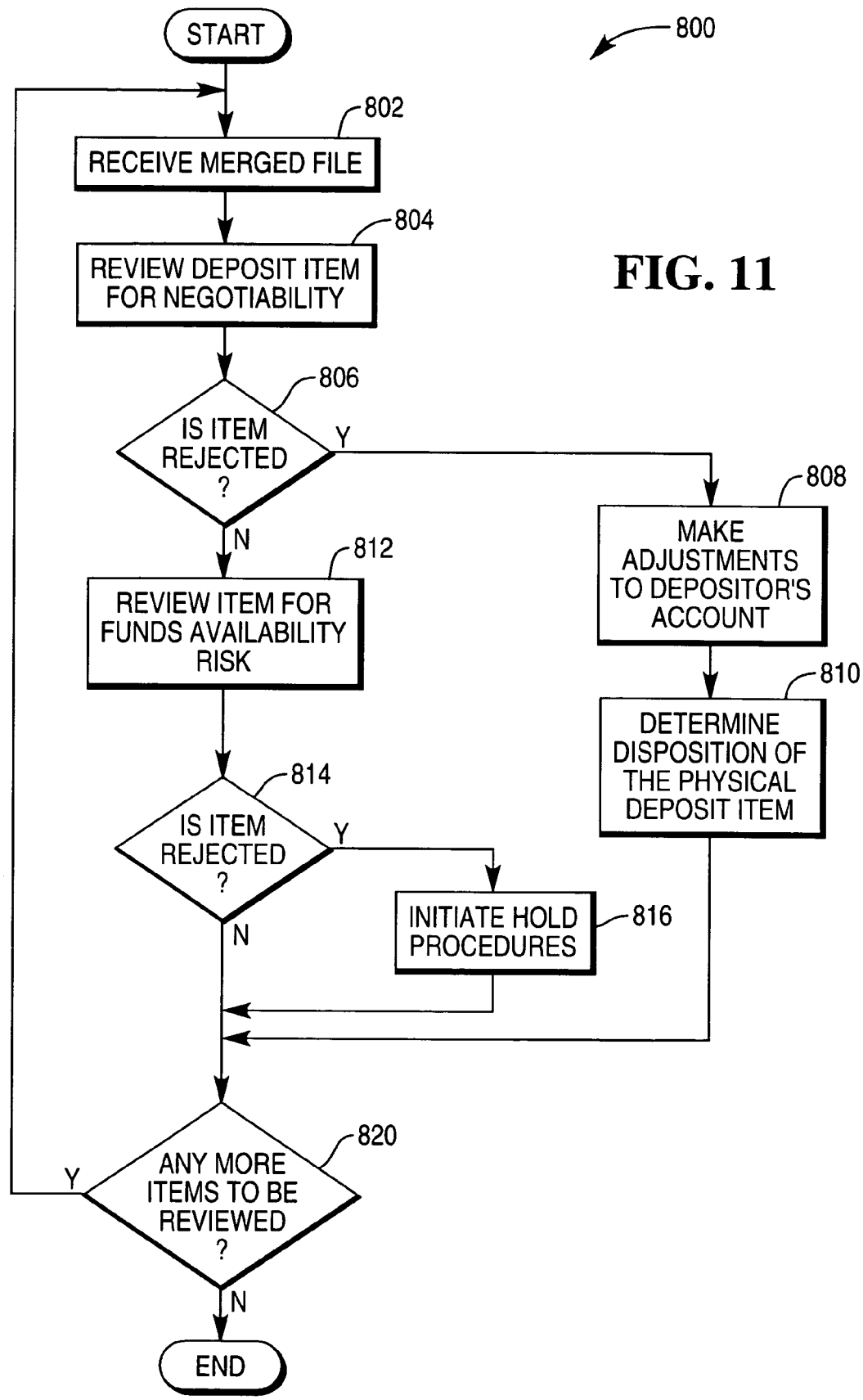
FIG. 11 is a flowchart illustrating steps involved in a deposit review operation performed by an operator at the deposit review workstation shown in FIG. 1.

Referring to FIG. 11, a flowchart 800 depicts steps involved in a deposit review operation performed by a human operator at the deposit review workstation 140. As shown in step 802, the merged file created in the flowchart of FIG. 9 is received at the deposit review workstation 140. Based upon data contained in the merged file, the human operator at the deposit review workstation 140 reviews deposited items for negotiability (steps 804 and 806). If the operator rejects the deposited item, the operator adjusts the depositor's account (step 808) and determines disposition of the physical deposit item (step 810).

The operator also reviews deposited items for funds availability risk (step 814). If the operator rejects the deposited item, the operator initiates hold procedures on these deposited items (step 816). It should be noted that these determinations by the operator are exemplary only and, therefore, other types of determinations are possible. The operator determines if there are any more deposit items to be reviewed (step 820). If the determination in step 820 is affirmative, these deposit items are reviewed in the same way as just described hereinabove.

It should be apparent that the above-described apparatus and methods of reviewing deposited cheques provides a way for a cheque which has been remotely deposited to be reviewed by a processor and/or a human operator.

Although the above description describes a deposit review process for a cheque which has been deposited remotely at a self-service terminal, such as the cheque depositing ATM 10-a, it is contemplated that the deposit review process may be provided in any type of remote environment in which cheques may be deposited. It is also conceivable that the deposit review process may even be employed when cheques are deposited at a bank teller station, for example.

Although the above description describes the host mainframe 4 as being located at a central facility, and the encoding and sorting workstation 2, the keying and balancing workstation 5, the consolidation server 100, the data server 110, and the document preparation and tray building workstation 120 as being located at a back office facility, it is contemplated that these elements may be located together at the same facility. It is conceivable that these elements may all be at different facilities. It is also conceivable that a first combination of these elements be at a first facility, a second combination of these elements be at a second facility, and a third combination of these elements be at a third facility. These facilities may be located relatively close to each other or relatively far apart from each other. Other combinations of the elements at different combinations of facilities are also possible.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of a human operator located at a deposit review workstation, the method comprising:

reviewing on a display of the deposit review workstation an image of a cheque which has been previously deposited by a customer at an automated teller machine (ATM), physically transported from the ATM to a back office facility of a financial institution, and is being presently processed at the back office facility of the financial institution;

receiving from a data server a merged file which contains transaction data associated with the cheque; and reviewing the transaction data contained in the merged file received from the data server to determine (i) negotiability of the deposited cheque, or (ii) funds availability risk associated with the deposited cheque, or (iii) both negotiability of the deposited cheque and funds availability risk associated with the deposited cheque.

2. A method according to claim 1, wherein the merged file comprises cheque image data corresponding to the deposited cheque.

3. A method according to claim 1, wherein the merged file comprises account details associated with the person who deposited the cheque.

4. A computerized method comprising:
(a) receiving from an automated teller machine (ATM) switch deposit transaction data associated with a cheque which has been previously deposited by a customer at an ATM, physically transported from the ATM to a back office facility of a financial institution, and is being presently processed at the back office facility of the financial institution;
(b) determining if the deposited cheque is acceptable based upon the deposit transaction data received from the ATM switch; and
(c) setting a flag and assigning a risk score if the deposited cheque is unacceptable.

5. A computerized method according to claim 4, further comprising:
(d) creating a second source file using set flags and assigned risk scores.

6. A computerized method according to claim 5, further comprising:
(e) receiving from a data server a merged file which contains deposit data received from an ATM switch and merged with deposit data retrieved from the data server; and
(f) determining if an image of the deposited cheque needs to be presented on a display of a deposit review workstation so that a human operator at the deposit review workstation can view the image of the cheque on the display to review the deposited cheque.

7. A computerized method according to claim 4, wherein (b) includes:
(b-1) determining if the cheque is deposited to a new account.

8. A computerized method according to claim 4, wherein (b) includes:
(b-1) determining if an account to which the deposited cheque has been made is overdrafted.

9. A computerized method according to claim 4, wherein (b) includes:
(b-1) determining if the amount of the deposited cheque is greater than a predetermined amount.

10. A computerized method according to claim 6, wherein (f) includes:
(f-1) determining if a codeline associated with the deposited cheque is blank.

11. A computerized method according to claim 6, wherein (f) includes:
(f-1) determining if a codeline associated with the deposited cheque is unreadable.

12. A computerized method according to claim 6, wherein (f) includes:
(f-1) determining if a signature is missing on the deposited cheque.

13. A computerized method according to claim 6, wherein (f) includes:
(f-1) determining if a date on the deposited cheque is a stale date.

14. A computerized method according to claim 6, wherein (f) includes:
(f-1) determining if an amount associated with the deposited cheque is greater than a predetermined amount.

15. A computerized method according to claim 6, wherein (f) includes:
(f-1) determining if the deposited cheque is a self-on-self deposit.

16. An apparatus comprising:
means for receiving from an automated teller machine (ATM) switch deposit transaction data associated with a cheque which has been previously deposited by a customer at an ATM, physically transported from the ATM to a back office facility of a financial institution, and is being presently processed at the back office facility of the financial institution;
means for determining if the deposited cheque is acceptable based upon the deposit transaction data received from the ATM switch; and
means for setting a flag and assigning a risk score if the deposited cheque is unacceptable.

17. An apparatus according to claim 16, further comprising means for creating a second source file using set flags and assigned risk scores.

18. An apparatus according to claim 17, further comprising
means for receiving from a data server a merged file which contains deposit data received from the ATM switch and merged with deposit data retrieved from the data server; and
means for determining if an image of the deposited cheque needs to be presented on a display of a deposit review workstation so that a human operator at the deposit review workstation can view the image of the cheque on the display to review the deposited cheque.

* * * * *